United States Patent [19]
Kobayashi

[11] 3,878,715
[45] Apr. 22, 1975

[54] VORTEX-TYPE FLOWMETER

[75] Inventor: Tamotsu Kobayashi, Yokohama, Japan

[73] Assignee: Hokushin Electric Works, Ltd., Tokyo, Japan

[22] Filed: Nov. 12, 1973

[21] Appl. No.: 414,800

[30] Foreign Application Priority Data
Nov. 30, 1972 Japan.............................. 47-120495

[52] U.S. Cl........................... 73/194 B; 73/194 EM
[51] Int. Cl............................ G01f 1/00; G01p 5/10
[58] Field of Search.................. 73/194 B, 194 EM; 324/34 FL

[56] References Cited
UNITED STATES PATENTS

| | | | |
|---|---|---|---|
| 3,274,831 | 9/1966 | Cushing | 73/194 |
| 3,564,915 | 2/1971 | Tomota et al. | 73/194 |
| 3,759,097 | 9/1973 | Cushing | 73/194 |
| 3,775,673 | 11/1973 | Watanabe | 73/194 |

OTHER PUBLICATIONS

Shercliff "The Theory of Electromagnetic Flow Measurement," pub. by Cambridge University Press, TC177s4, pgs. 1-3.

*Primary Examiner*—Herbert Goldstein

[57] ABSTRACT

A flowmeter having no moving parts and including a vortex shedder mounted transversely in a conduit forming a passage for the fluid being measured. The shedder is provided with an axially-extending gap perpendicular to the direction of fluid flow in the conduit, and means to establish a magnetic field in the gap whose lines of flux are parallel to the direction of flow. Fluid oscillations produced in the gap as a result of Karman vortices are detected on the induction principle by a pair of electrodes mounted on said shedder at axially-spaced positions within said gap. The frequency of the signal developed at the electrodes is proportional to the flow rate or flow velocity and is undisturbed by common mode flow noise.

5 Claims, 5 Drawing Figures

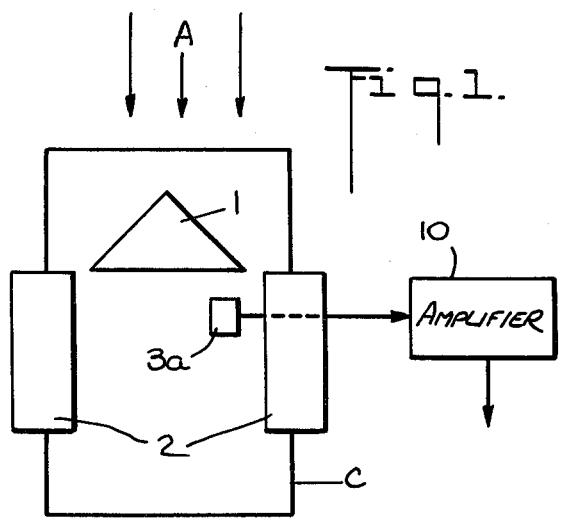
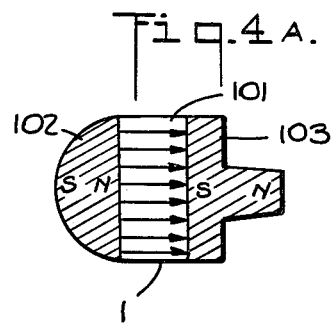
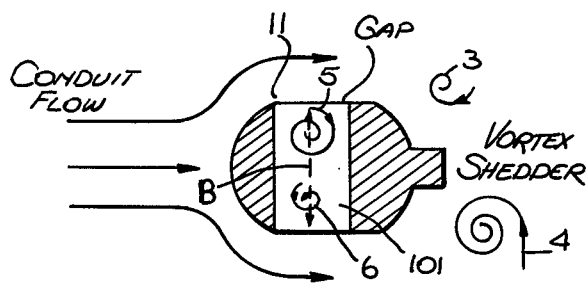
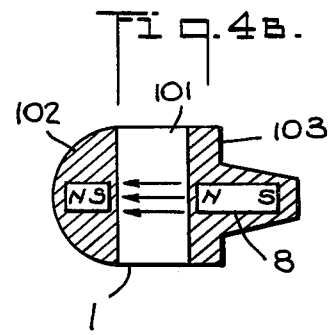
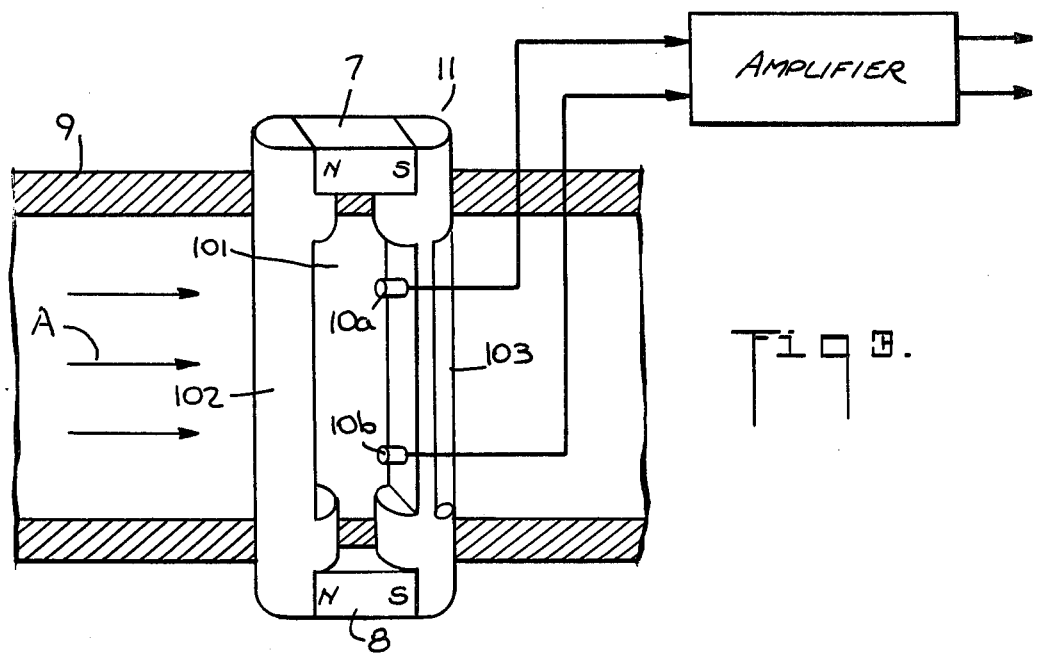

VORTEX-TYPE FLOWMETER

BACKGROUND OF THE INVENTION

This invention relates generally to the measurement of fluid flow rate, and more particularly to a vortex-type flow-meter operating on the induction principle.

It is well known that under certain circumstances, the presence of a vortex shedder in a flow conduit will give rise to periodic Karman vortices. The number of Karman vortices formed per unit of time, i.e., frequency of the Karman vortices, is a function of the flow velocity or flow rate of the fluid flowing through the conduit. Thus the flow velocity or flow rate of the fluid can be obtained by measuring the frequency of Karman vortices.

In order to measure the frequency of Karman vortices, a conventional vortex flowmeter such as that disclosed in the U.S. Pat. No. 3,572,117 to Rodley, is generally equipped with a hot wire sensor or a thermistor sensor placed behind the vortex shedder in the conduit to detect thermal variations caused by pressure or velocity variations of the fluid due to periodic Karman vortices.

As a consequence, the conventional vortex-type flowmeter cannot be used to measure flow velocity or flow rate of a high-temperature fluid, for the temperature of the fluid to be measured is theoretically limited. Also the conventional flowmeter has a low order of reliability, in that the hot wire detector or thermistor is mechanically weak. Moreover, when a liquid to be measured is mixed with mud or other contaminants, the conventional vortex-type meter is impractical.

To overcome these drawbacks, there has been developed a flowmeter adapted to count the number of Karman vortices by the induction principle. An induction-type of vortex meter is disclosed in Japanese Patent Pub. No. 20915/1967 entitled "Velocity Measuring Equipment."

In an induction-type vortex meter, the Karman streets produced behind the shedder in the conduit are subjected to a magnetic field whose lines of flux are perpendicular to the flow direction, the signal induced in the fluid being picked up by a pair of electrodes mounted in the conduit. This signal corresponds to the sum of the average velocity of the fluid in the conduit and the oscillation velocity of the fluid due to Karman vortices. Thus in theory, one can measure flow velocity or flow rate by detecting velocity oscillations due to Karman vortices.

But in practice it is very difficult to detect the velocity oscillations, for the amplifier in a vortex flowmeter of the induction type is readily saturated by the signal corresponding to the average velocity of the fluid in the conduit. Moreover when the electromagnet for producing the magnetic field is mounted on the exterior of the flow conduit, the arrangement is quite expensive, particularly if the diameter of the flow conduit is large.

Since in this induction-type vortex flowmeter, the electromagnetic field is established behind the vortex shedder in the flow conduit, the resultant output signal has a low signal-to-noise ratio, for the production of Karman vortices by the vortex shedder is inhibited by the magnetic field and new vortices are created thereby.

SUMMARY OF THE INVENTION

In view of the foregoing, it is the main object of this invention to provide a practical, low cost and highly accurate vortex flowmeter operating on the induction principle.

Briefly stated, this object is attained by a flowmeter including a vortex shedder mounted transversely in a conduit forming a passage for the fluid being measured, the shedder having an axially-extending gap which is at right angles to the direction of flow. A magnetic field is established within the gap, the lines of flux being parallel to said flow direction. The frequency of fluidic oscillations produced in the gap is detected by a pair of electrodes mounted at axially-spaced positions.

OUTLINE OF THE DRAWING

For a better understanding of the invention as well as other objects and further features thereof, reference is made to the following detailed description to be read in conjunction with the accompanying drawing, wherein:

FIG. 1 is a schematic diagram of a prior art flowmeter, shown in cross section, as viewed from the upper side;

FIG. 2 is a cross section taken across a vortex shedder in accordance with the invention, the vortex shedder having a gap therein whereby fluid oscillations due to Karman vortices are created in said gap;

FIG. 3 is a schematic diagram showing an embodiment of a flowmeter according to the present invention, including said vortex shedder having a gap therein; and FIG. 4 (a) and (b) are cross sectional views of vortex shedders showing alternative means for establishing a magnetic field in the gap of the vortex shedder.

DESCRIPTION OF THE INVENTION

The Prior Art

Referring now to FIG. 1, there is shown a prior art vortex flowmeter operating on the induction principle. In this meter, a vortex shedder 1 having a triangular configuration is mounted within a flow conduit C through which a fluid stream flows in the direction indicated by arrows A. A pair of electrodes is mounted on the conduit, only electrode 3a being illustrated in this figure. An electromagnetic field is established which is perpendicular to the direction of flow, in the same manner as in a standard electromagnetic flowmeter. This field is generated by a pair of electromagnets 2 which may be installed within or outside of the conduit.

Derived from the electrodes is a signal corresponding to the sum of the average velocity of the fluid in the conduit and the oscillation fluid due to Karman vortices, this signal being applied to an external amplifier 10. The output of amplifier 10 may be applied to a suitable counter through a wave shaper, as disclosed in the above-identified Japanese patent publication. Because this amplifier is easily saturated by the signal corresponding to the average velocity of the fluid in the conduit, it is difficult to detect the velocity oscillation due to Karman vortices.

And because electromagnets 2 are installed in the conduit to produce a magnetic field behind vortex shedder 1, the resultant signal has a low signal-to-noise ratio, for this field inhibits the development of Karman vortices due to the shedder, the magnetic field creating new vortices.

THE INVENTION

Referring now to FIGS. 2 and 3, there is shown a vortex-type meter of the induction type in accordance with the invention, including a vortex shedder of the rod type generally designated by numeral 11.

The shedder is mounted transversely with respect to the flow conduit 9 and is provided with a longitudinally-extending gap 101, both shedder 11 and gap 101 being at right angles to the direction of flow A. As shown in FIGS. 2 and 3, Karman vortices 3 and 4 are generated behind shedder 11 in the usual manner. But the presence of gap 101 in the shedder also causes small vortices 5 and 6 to be generated in the gap.

The development and extinction of vortices 5 and 6 occur repeatedly and alternate with respect to vortices 3 and 4. As a consequence, fluid in gap 101 oscillates stably at a frequency corresponding to the frequency of the Karman vortices in a direction indicated by dotted line B which is perpendicular to the conduit flow direction A. This makes it possible to measure flow velocity or rate by detecting the fluid oscillation in the gap in a mode which is free of the influence of the average flow velocity of the fluid.

In a vortex flowmeter according to the invention, the shedder having the gap therein is provided with means establishing a magnetic field in the gap in parallel relation to the direction of flow A, so that an electromagnetic force depending on the fluid oscillations may be detected in the gap. As shown in FIG. 3, vortex shedder 11 is defined by two parallel ferromagnetic bars 102 and 103 whose ends are bridged by permanent magnets 7 and 8. The lines of flux in the resultant electromagnetic field extend between bars 102 and 103.

Installed on rear bar 103 at spaced axial positions facing the gap 101 are a pair of electrodes 10a and 10b. In practice, the electrodes may alternatively be mounted on bar 102.

Shedder 11 is mounted in the conduit 9 at right angles to the direction of flow A so that the axis of gap 101 is also perpendicular to the direction of flow, the magnets 7 and 8 secured to the ends of bars 102 and 103 being outside the conduit. In practice shorter bars may be used so that these magnets are then situated within the conduit. As a result, an electromagnetic force corresponding to the fluid oscillations caused by Karman vortices in gap 101 can be detected by electrodes 10a and 10b.

MODIFICATIONS

FIGS. 4 (a) and 4 (b) show alternative means for establishing an electromagnetic field within the gap of the vortex shedder. In FIG. 4 (a), bars 102 and 103 of the shedder are themselves permanently magnetized, so that the field producing means is incorporated in the shedder structure. In FIG. 4 (b), magnets 7 and 8, instead of being mounted at the ends of bars 102 and 103, are embedded within the bars.

In FIGS. 2, 3, 4 and 5 the magnetic field established within the shedder gap is a D-C field. It is alternatively possible to make use of A-C excited electromagnets to establish an A-C field, but in this instance the frequency of the A-C field must be displaced from the frequency range of the fluid oscillations to avoid interference therebetween.

In FIG. 3, electrodes 10a and 10b are of the electric conduction types in which the electrodes make direct contact with the fluid in the gap. When the electrodes are conductive, they must be insulated from the vortex shedder. But in practice use may be made of capacitive-type electrodes in which the electrodes are covered with a dielectric film such as Teflon. In that case, the capacitive electrodes are coupled to an amplifier having a high input impedance. Electrodes covered by Teflon film have the advantage that contaminants in the fluid cannot adhere to the electrodes to form deposits thereon.

It is apparent from the foregoing description that a flowmeter in accordance with the present invention has the following features:

a. Because a conventional flowmeter has its magnetic field producing means installed behind the vortex shedder, flow velocity cannot be measured accurately, for noise is induced due to the vortices generated by the magnetic field producing means. But with the present invention, since the magnetic field producing means is incorporated within the vortex shedder, noise is not induced in the signal output from the electrodes and the flow velocity can therefore be measured accurately.

b. Because the magnetic field producing means is installed in the vortex shedder, the magnetic field producing means for a flowmeter of large diameter are not nearly as expensive as those in a conventional flowmeter. Thus, the present invention is advantageous for flowmeters of large diameter.

c. Because the fluid oscillations produced in the flowmeter are not disturbed by the average fluid flow in the conduit and are excited only by the Karman vortices, the output can be amplified without regard to the average noise. As a result, the flow velocity can be measured very accurately.

d. Because the gap of vortex shedder can be made relatively wide, the gap will not be blocked by foreign materials or contaminants.

e. Because the flowmeter in accordance with the present invention is of simple construction, it can be made easily and inexpensively.

f. Because the flowmeter in accordance with the present invention has neither movable parts nor mechanically weak parts such as a hot wire sensor, it has a high order of reliability.

g. Because in a flowmeter in accordance with the present invention, the frequency component in the output signal which corresponds to the flow velocity is utilized for measurement, the frequency of the output signal has no relation to the magnitude of the electromagnetic force. Hence the flowmeter is usable even if the electrical conductivity of the fluid to be measured is not uniform.

While there has been shown preferred embodiments of the invention, it will be appreciated that many changes may be made therein without, however, departing from the essential spirit of the invention as disclosed herein.

I claim:
1. A flowmeter of the vortex type comprising:
    A. a flow conduit forming a passage for the fluid to be measured;
    B. a vortex shedder mounted in said conduit transversely with respect to the direction of fluid flow, said shedder having an axially-extending gap at right angles to said direction of flow;

C. permanent-magnet means incorporated in the body of said shedder to establish a magnetic field across said gap whose lines of flux are parallel to said direction of flow; and D. a pair of electrodes mounted on said shedder at axially-spaced positions in said gap to produce a signal whose frequency is a function of flow rate.

2. A flowmeter as set forth in claim 1, wherein said shedder is formed by a pair of parallel bars whose ends are interconnected by a pair of permanent magnets.

3. A flowmeter as set forth in claim 1, wherein said shedder is formed by a pair of permanently magnetized parallel bars.

4. A flowmeter as set forth in claim 1, wherein said shedder is formed by a pair of parallel bars which incorporate permanent magnets.

5. A flowmeter as set forth in claim 1, wherein said electrodes are coated with dielectric films and are capacitively coupled to said fluid, said electrodes being connected to an amplifier having a high input impedance.

* * * * *